(12) United States Patent
Pan

(10) Patent No.: US 12,602,819 B2
(45) Date of Patent: Apr. 14, 2026

(54) IMAGE PROCESSING APPARATUS, FEATURE MAP GENERATING APPARATUS, LEARNING MODEL GENERATION APPARATUS, IMAGE PROCESSING METHOD, AND COMPUTER-READABLE RECORDING MEDIUM

(71) Applicant: NEC Corporation, Tokyo (JP)

(72) Inventor: Yadong Pan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 18/274,102

(22) PCT Filed: Jun. 28, 2021

(86) PCT No.: PCT/JP2021/024380
§ 371 (c)(1),
(2) Date: Jul. 25, 2023

(87) PCT Pub. No.: WO2023/275941
PCT Pub. Date: Jan. 5, 2023

(65) Prior Publication Data
US 2024/0338845 A1     Oct. 10, 2024

(51) Int. Cl.
*G06T 7/73* (2017.01)
*G06V 10/771* (2022.01)

(52) U.S. Cl.
CPC .............. *G06T 7/73* (2017.01); *G06V 10/771* (2022.01); *G06T 2207/20044* (2013.01); *G06T 2207/30196* (2013.01)

(58) Field of Classification Search
CPC ............. G06T 7/73; G06T 2207/20044; G06T 2207/30196; G06V 10/771; G06V 10/7715; G06V 40/20–28
See application file for complete search history.

(56) References Cited

U.S. PATENT DOCUMENTS

| | | |
|---|---|---|
| 2018/0322606 A1 | 11/2018 | Das et al. |
| 2018/0336454 A1 | 11/2018 | Lim et al. |

(Continued)

FOREIGN PATENT DOCUMENTS

| | | | | |
|---|---|---|---|---|
| CN | 110175528 A | * | 8/2019 | ....... G06F 18/23213 |
| CN | 111860276 A | | 10/2020 | |

(Continued)

OTHER PUBLICATIONS

JP Office Action for JP Application No. 2023-576414, mailed on Sep. 10, 2024 with English Translation.

(Continued)

*Primary Examiner* — Utpal D Shah
*Assistant Examiner* — Jack Peter Kraynak
(74) *Attorney, Agent, or Firm* — Sughrue Mion, PLLC

(57) ABSTRACT

An image processing apparatus includes a feature map generation unit and a grouping unit. The feature map generation unit generate a first feature map that specifies a horizontal location of the person in an image in a horizontal direction and a second feature map that specifies a vertical location of the person in the image in a vertical direction. The grouping unit uses locations of joints detected in the image in the horizontal direction and vertical direction, the first feature map, and the second feature map, to group each of the joints to a corresponding person.

12 Claims, 9 Drawing Sheets

(56) References Cited

U.S. PATENT DOCUMENTS

| | | | |
|---|---|---|---|
| 2019/0171870 A1* | 6/2019 | Vajda | G06N 3/084 |
| 2019/0304076 A1* | 10/2019 | Nina Paravecino | G06T 7/11 |
| 2020/0273201 A1* | 8/2020 | Mittal | G06V 10/454 |
| 2021/0073527 A1* | 3/2021 | Huang | H04L 61/103 |
| 2021/0104067 A1 | 4/2021 | Fu et al. | |
| 2021/0142064 A1* | 5/2021 | Shimizu | G06V 10/764 |
| 2024/0046618 A1* | 2/2024 | Zhang | G06N 3/084 |
| 2024/0161316 A1* | 5/2024 | Tao | G06T 7/292 |

FOREIGN PATENT DOCUMENTS

| | | | |
|---|---|---|---|
| JP | 2018-057596 A | | 4/2018 |
| JP | 2020052476 A | * | 4/2020 |

OTHER PUBLICATIONS

International Search Report for PCT Application No. PCT/JP2021/024380, mailed on Aug. 17, 2021.

Written opinion for PCT Application No. PCT/JP2021/024380, mailed on Aug. 17, 2021.

Kaiming He, et al., "Mask R-CNN.", 2017 IEEE International Conference on Computer Vision (ICCV 2017).

* cited by examiner

IMAGE DATA →

IMAGE PROCESSING APPARATUS 10

IMAGE DATA ACQUISITION UNIT 13

STORAGE UNIT 14

LEARNING MODEL 16

IMAGE DATA 17

FEATURE MAP GENERATION UNIT 11

JOINT DETECTION UNIT 15

GROUPING UNIT 12

↓

GROIPING RESILT

FIRST FEATURE MAP

SECOND FEATURE MAP

FIRST FEATURE MAP

SECOND FEATURE MAP

IMAGE PROCESSING APPARATUS, FEATURE MAP GENERATING APPARATUS, LEARNING MODEL GENERATION APPARATUS, IMAGE PROCESSING METHOD, AND COMPUTER-READABLE RECORDING MEDIUM

This application is a National Stage Entry of PCT/JP2021/024380 filed on Jun. 28, 2021, the contents of all of which are incorporated herein by reference, in their entirety.

TECHNICAL FIELD

The present invention relates to an image processing apparatus and an image processing method for processing image data of an image including a person, and further relates to a computer-readable recording medium in which is recorded a program for realizing the same. Further, the present invention relates to a feature map generation apparatus for generating a feature map used in an image processing apparatus and an image processing method, and in addition, relates to a learning model generation apparatus for generating a learning model used for generating a feature map.

BACKGROUND ART

In recent years, research on estimating the posture of a person from an image has attracted attention. Such research is expected to be used in the fields of image surveillance system and sports. Further, by estimating the posture of a person from an image, for example, the movement of a clerk in a store can be analyzed, and it is considered that it can contribute to efficient product placement.

Then, in estimating the posture of the person from such an image, it is important to correctly associate the joint detected from the image with the person in the image. This is because when there is a plurality of people in the image and the detected joints are associated with the wrong person, the posture estimation accuracy is greatly reduced.

For example, Non-Patent Document 1 discloses a system for associating joints with a person in an image. Specifically, when image data of an image including a person is input, the system disclosed in Non-Patent Document 1 uses a convolutional neural network that learns an image of a person's joints to detect all the person's joints from the image data input.

Further, the system disclosed in Non-Patent Document 1 uses a convolutional neural network that learns an image of the entire person for each person to generate a feature map showing instance segmentation of the person for each person in the image. After that, the system disclosed in Non-Patent Document 1 compares the instance segmentation in the feature map with the detected joint for each feature map to associates the detected joint with the corresponding person.

CITATION LIST

Non Patent Literature

[NPL1] Kaiming He, et al., "Mask R-CNN.", 2017 IEEE International Conference on Computer Vision (ICCV 2017)

SUMMARY OF INVENTION

Technical Problem

However, in the system disclosed in Non-Patent Document 1 described above, it is necessary to generate the feature map for each person in the image. For this reason, the more people are present in the image, the greater the processing load on the system becomes. Therefore, in the system disclosed in Non-Patent Document 1 described above, the applicable fields are limited.

An example of an object of the present invention is to provide an image processing apparatus, an image processing method, and a computer-readable recording medium capable of performing an association between joints and a person without being influenced by the number of people present in the image. Another example of an object of the present invention is to provide a feature map generation apparatus and a learning model generation apparatus applicable to an image processing apparatus.

Solution to Problem

To achieve the above-described object, an image processing apparatus according to one aspect of the present invention is an apparatus, including:

a feature map generation unit configured to generate a first feature map that specifies a horizontal location of the person in an image in a horizontal direction and a second feature map that specifies a vertical location of the person in the image in a vertical direction, a grouping unit configured to use locations of joints detected in the image in the horizontal direction and vertical direction, the first feature map, and the second feature map, to group each of the joints to a corresponding person.

To achieve the above-described object, a feature map generation apparatus according to one aspect of the present invention is an apparatus, including:

a feature map generation unit configured to generate a first feature map that specifies a horizontal location of the person in an image in a horizontal direction and a second feature map that specifies a vertical location of the person in the image in a vertical direction.

To achieve the above-described object, a learning model generation apparatus according to one aspect of the present invention is an apparatus, including:

a learning model generation unit configured to use an image including a person, a first feature map for specifying the location of the person in a horizontal direction in the image, and a second feature map for specifying the location of the person in a vertical direction in the image as training data, to generate a learning model in which a relationship between the image, the first feature map, and the second feature map is machine-learned.

To achieve the above-described object, an image processing method according to one aspect of the present invention is a method, including:

a feature map generation step of generating a first feature map that specifies a horizontal location of the person in an image in a horizontal direction and a second feature map that specifies a vertical location of the person in the image in a vertical direction, a grouping step of using locations of joints detected in the image in the horizontal direction and vertical direction, the first feature map, and the second feature map, to group each of the joints to a corresponding person.

Furthermore, a computer-readable recording medium according to one aspect of the present invention is a computer-readable recording medium that includes a program recorded thereon, the program including instructions that cause the computer to carry out:

a feature map generation step of generating a first feature map that specifies a horizontal location of the person in an image in a horizontal direction and a second feature map that specifies a vertical location of the person in the image in a vertical direction, a grouping step of using locations of joints detected in the image in the horizontal direction and vertical direction, the first feature map, and the second feature map, to group each of the joints to a corresponding person.

Advantageous Effects of Invention

As described above, according to the present invention, it is possible to perform an association between joints and a person without being influenced by the number of people present in the image.

DESCRIPTION OF EMBODIMENTS

First Example Embodiment

The following describes an image processing apparatus, an image processing method, and a program for image processing in a first example embodiment with reference to FIGS. 1 to 5.

Apparatus Configuration

Figure 1:
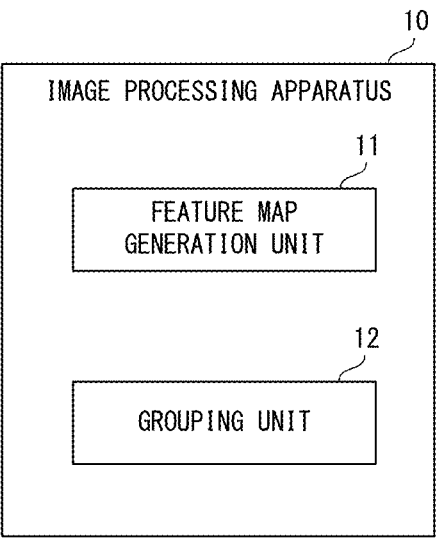
FIG. 1 is a block diagram showing an overall configuration of an image processing apparatus according to a first example embodiment.

First, an overall configuration of the image processing apparatus according to the first example embodiment will be described with reference to FIG. 1. FIG. 1 is a block diagram showing an overall configuration of an image processing apparatus according to a first example embodiment.

An image processing apparatus 10 according to the first example embodiment shown in FIG. 1 is an apparatus that process an image data of image including persons. As shown in FIG. 1, the image processing apparatus 10 includes a feature map generation unit 11 and a grouping unit 12.

The feature map generation unit 11 generate a first feature map and a second feature map. The feature map is map for specifying a horizontal location of the person in the image in a horizontal direction. The second feature map is map for specifying a vertical location of the person in the image in a vertical direction.

The grouping unit 12 uses locations of joints detected in the image in the horizontal direction and vertical direction, the first feature map, and the second feature map, to group each of the joints to a corresponding person.

In this way, in the image processing apparatus 10, since the first feature map and the second feature map are generated, the joint and the person can be associated with each other without being affected by the number of people existing in the image.

Figure 2:
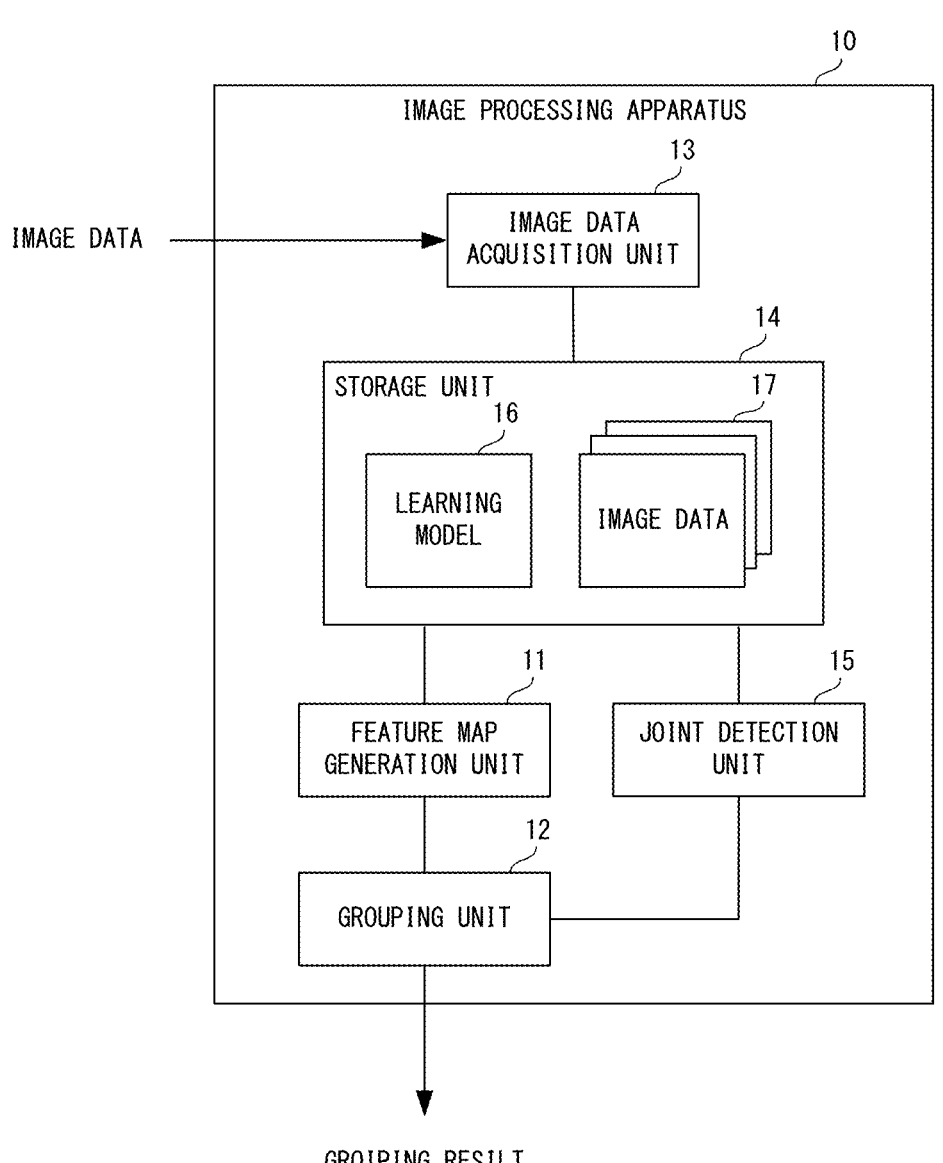
FIG. 2 is a block diagram showing an example of a specific configuration of the image processing apparatus according to the first example embodiment.
Figure 3A:
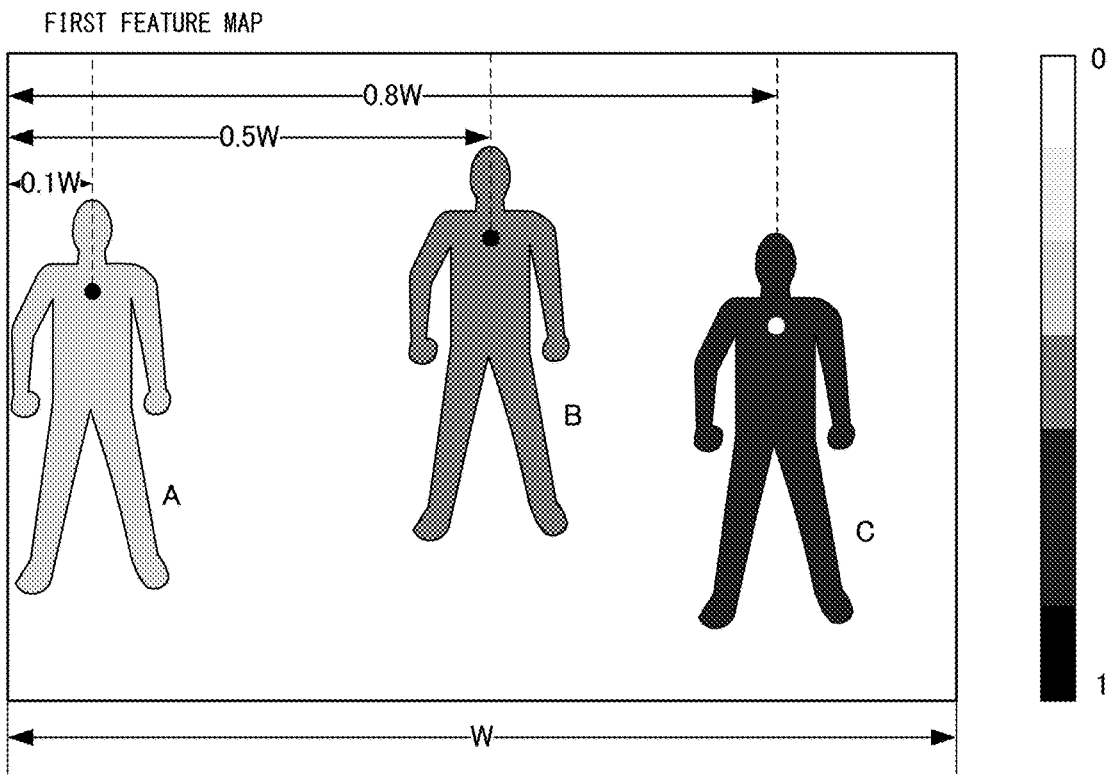
FIG. 3A is a diagram showing an example of a first feature map generated in the first example embodiment.
Figure 3B:
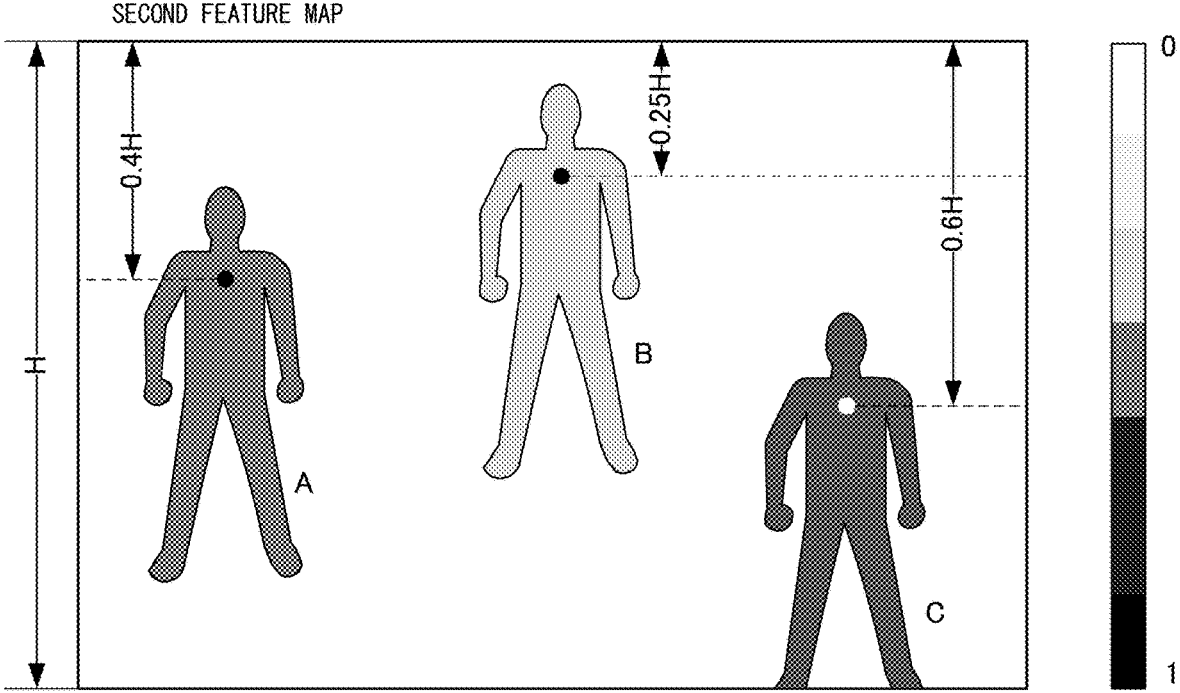
FIG. 3B is an example of a second feature map generated in the first example embodiment.
Figure 4:
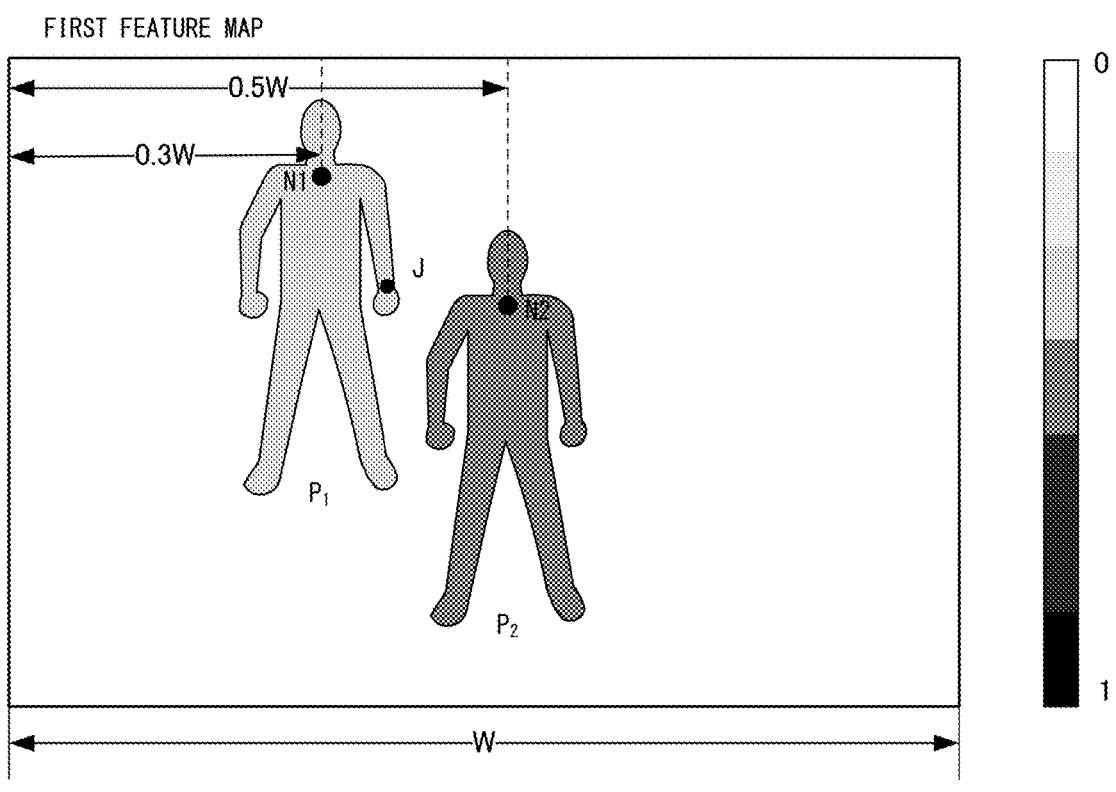
FIG. 4 is a diagram for explaining a processing in a grouping unit in the first example embodiment.
Figure 4:
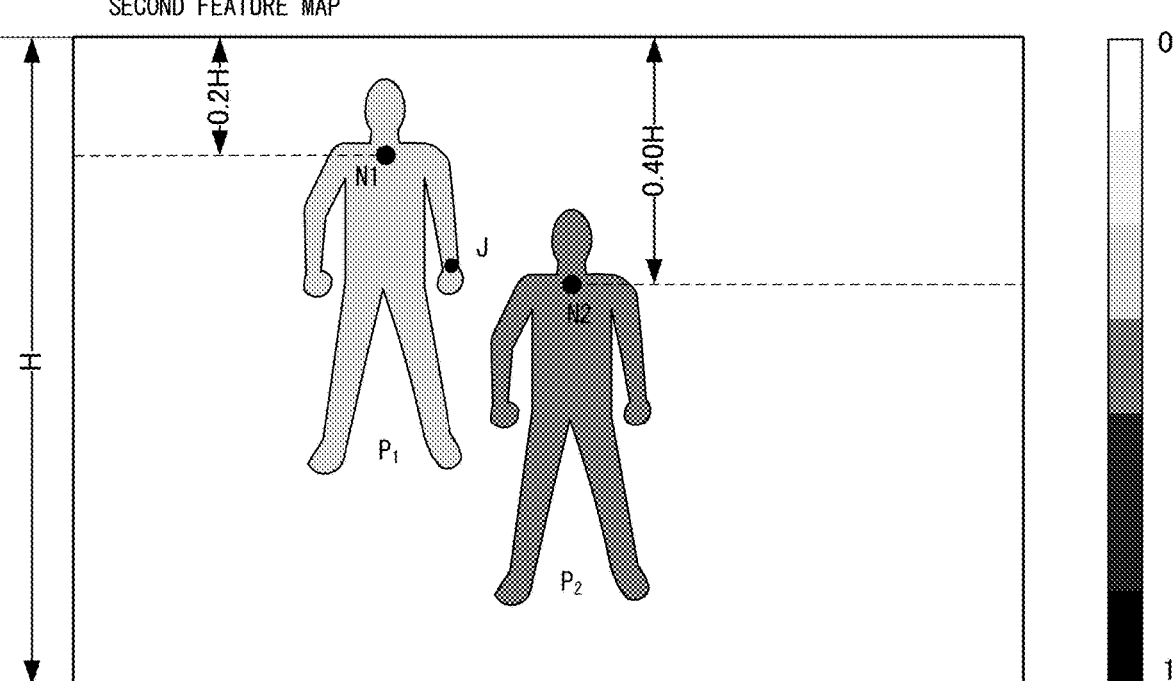

Next, the configuration and the functions of the image processing apparatus 10 according to the first example embodiment will be specifically described with reference to FIG. 2. FIG. 2 is a block diagram showing an example of a specific configuration of the image processing apparatus according to the first example embodiment. FIG. 3A is a diagram showing an example of a first feature map generated in the first example embodiment. FIG. 3B is an example of a second feature map generated in the first example embodiment. FIG. 4 is a diagram for explaining a processing in a grouping unit in the first example embodiment.

As shown in FIG. 2, in the first example embodiment, in addition to the feature map generation unit 11 and the grouping unit 12 described above, the image processing apparatus 10 includes an image data acquisition unit 13, a storage unit 14, and a joint detection unit 15.

The image data acquisition unit 13 acquires the image data 17 of the image including persons captured by the imaging device and stores the acquired image data 17 in the storage unit 14. The image data acquisition source may be an imaging device, an external storage device for storing the image data, or the like. The storage unit 14 also stores a learning model 16 which will be described later.

As shown FIG. 3A, in the first example, the feature map generation unit 11 generates, as the first map, a map that is composed of the same number of pixels as the pixels constituting the image, and assigns a numerical value indicating a location of the person in the horizontal direction to each of the pixels in an area corresponding to the person. The feature map generation unit 11, as the second map, a map that is composed of the same number of pixels as the pixels constituting the image, and assigns a numerical value indicating a location of the person in the vertical direction to each of the pixels in an area corresponding to the person.

Specifically, as shown in FIG. 3A, in the first feature map, the feature map generation unit 11 assigns a following value in the pixels of the area corresponding to the person, as "a numerical value indicating a location of the person in the horizontal direction". The assigned value is a value indicating a ratio of the horizontal distance (0.1 W, etc.) from an origin of the first feature map to a reference point of the person to a horizontal length W of the first feature map.

As shown in FIG. 3B, in the second feature map, the feature map generation unit 11 assigns a following value in the pixels of the area corresponding to the person, as "a numerical value indicating a location of the person in the vertical direction". The assigned value is a value indicating a ratio of the vertical distance (0.25 H, etc.) from an origin of the second feature map to the reference point of the person to a vertical length H of the second feature map.

In FIGS. 3A and 3B, the origin of the map is set at the upper left corner point, but the origin is not limited to this. Further, in FIGS. 3A and 3B, the reference point of the person is set at the base of the neck of the person, but this is also not limited.

Further, in the first example embodiment, the feature map generation unit 11 can also generate the first feature map and the second feature map by using the learning model 16 stored in the storage unit 14. The learning model 16 is constructed in advance by machine learning the relationship between the image including persons and the first feature map and the second feature map. Examples of machine learning methods include deep learning. The constructed learning model 16 is stored in the storage unit 14. The learning model 16 is constructed by a learning model generation apparatus later.

The joint detection unit 15 detects joints of the person from the image of the image data acquired by the image data acquisition unit 13. Specifically, the joint detection unit 15 can detect the joints of the person in the image data by applying the image data to a learning model for detection joints. Examples of the learning model for detection joints include a model in which the relationship between a person's image and each joint of the person in the image is machine-learned. When the image data is input, the machine learning model outputs, for example, a heat map showing a probability that the joint exists for each joint in the image. In this case, the joint detection unit 15 detects each joint based on the output heat map.

In the first example embodiment, the method for detecting the joints from image is not limited. The joint detection unit 15 can also detect each joint from the image by using, for example, a feature amount for each joint prepared in advance.

In the first example embodiment, the grouping unit 12 specifies, for each joint detected from the image, the numerical value of the pixel corresponding to the joint in the first feature map and the numerical value of the pixel corresponding to the joint in the second feature map.

Next, the grouping unit 12 calculates, for each joint detected from the image, for each of the persons in the image, a distance between the joint and the person by using two specified numerical values, the numerical value indicating the location of the person in the horizontal direction, and the numerical value indicating the location of the person on in the vertical direction. After that, the grouping unit 12 determines, for each joint detected from the image, the person corresponding to the joint based on the distance calculated for each person, and executes grouping based on the determination result.

Specifically, as shown in FIG. 4, the grouping unit 12 projects each joint detected by the joint detection unit 15 onto the first feature map and the second feature map. In the example of FIG. 4, only the joint J is projected on the first feature map and the second feature map.

Then, the grouping unit 12 specifies a numerical value LX (J) of the corresponding pixel in the first feature map and a numerical value LY (J) of the corresponding pixel in the second feature map for the joint J. Further, the grouping unit 12 specifies a numerical value LX ($N_i$) indicating the location of the person in the horizontal direction and a numerical value LY ($N_i$) indicating the location in the vertical direction for each of the persons $P_1$ and $P_2$. "$N_i$" indicates the reference point of each person used to create the first feature map and the second feature map.

After that, the grouping unit 12 substitutes the specified numerical values LX (J) and LY (J), the numerical values LX ($N_i$) and LY ($N_i$) indicating the location of the person into the following math 1, and calculates the distance Ad (J, $P_i$) between the joint J and the person $P_i$.

$$Ad\ (J, P_i) = [LX\ (J) - LX\ (N_i)]^2 + [LY\ (J) - LY\ (N_i)]^2 \qquad \text{[Math 1]}$$

In the example of FIG. 4, for the person $P_1$, LX (J)=0.3 W, LX ($N_1$)=0.3 W, LY (J)=0.2 H, and LY ($N_1$)=0.2 H. Therefore, Ad (J, $P_1$)=0. On the other hand, for the person P2, LX (N2)=0.5 W and LY (N2)=0.4 H. Therefore, Ad (J, $P_2$)=0.04 $(W+H)^2$. And then, in the example of FIG. 5, the grouping unit 12 determines the person to which the joint J corresponds to the person $P_1$.

In addition, the grouping unit 12 can set conditions to determine a person corresponding to a joint in order to avoid apparently unnatural grouping. The conditions include that the calculated distance does not exceed the set value, that multiple joints of the same type do not correspond to the same person, and the like.

Apparatus Operations

Figure 5:
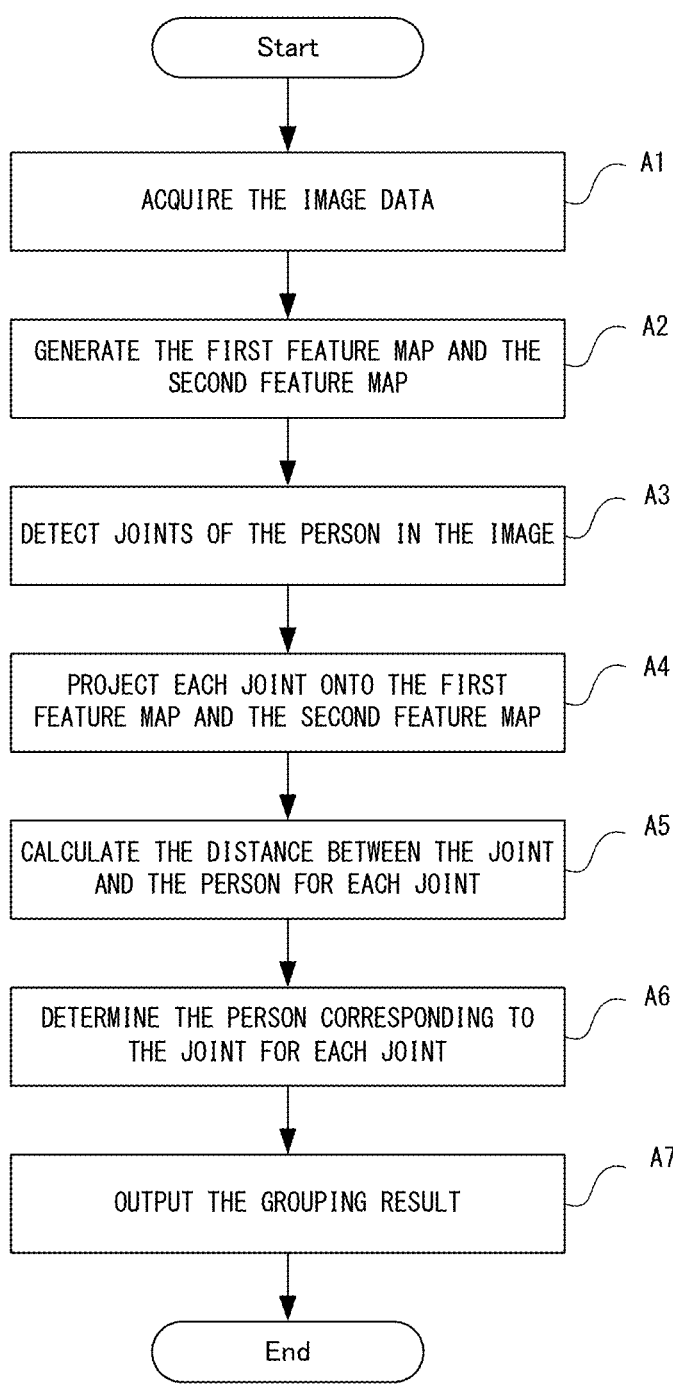
FIG. 5 is a flowchart showing operations of the image processing apparatus according to the first example embodiment.

Next, operations of the image processing apparatus 10 according to the first example embodiment will be described with reference to FIG. 5. FIG. 5 is a flowchart showing operations of the image processing apparatus according to the first example embodiment. In the following description, FIGS. 1 to 4 are referenced when necessary. Also, in the first example embodiment, the image processing method is carried out by operating the image processing apparatus 10. Therefore, the following description of operations of the image processing apparatus 10 substitutes for a description of the image processing method in the first example embodiment.

As shown in FIG. 5, first, the image data acquisition unit 13 acquires the image data 17 of the image including the person and stores the acquired image data 17 in the storage unit 14 (Step A1).

Next, the feature map generation unit 11 applies the image data acquired in step A1 to the learning model 16 stored in the storage unit 14 to generate the first feature map and the second feature map (Step A2).

Next, the joint detection unit 15 detects joints of the person in the image from the image of the image data acquired in step A1 (Step A3). Further, in step A3, the joint detection unit 15 specifies the coordinates of each of the detected joints.

Next, the grouping unit 12 projects each joint detected in step A3 onto the first feature map and the second feature map (step A4).

Next, the grouping unit 12 specifies, for each joint, the numerical value of the pixel corresponding to the joint in the first feature map and the numerical value of the pixel corresponding to the joint in the second feature map. Then, the grouping unit 12 calculates, for each joint, the distance between the joint and the person for each person in the image by using the specified value and the numerical value indicating the location of each person (Step A5).

Next, the grouping unit 12 determines, for each joint, for each person, the person corresponding to the joint based on the distance calculated in step A5, and executes grouping based on the determination result (Step A6).

After that, the grouping unit 12 outputs the grouping result obtained in step A6 (step A7). The grouping result is used for estimating the posture of the person, for example, in a system for estimating the posture of a person.

As described above, according to the first example embodiment, when the detected joint is projected on the first feature map and the second feature map, the distance to each person is obtained for each joint. Then, when the distance is obtained, the person to which the joint corresponds can be easily identified. That is, according to the first example embodiment, the association between the joint and the person can be executed without being influenced by the number of people existing in the image.

Program

A program for image processing according to the first example embodiment may be a program that enables a computer to execute the steps A1 to A7 shown in FIG. 5. It is possible to realize the image processing apparatus 10 and the image processing method according to the first example embodiment by installing this program to a computer and executing the program. In this case, a processor of the computer functions as the feature map generation unit 11, the grouping unit 12, the image data acquisition unit 13, and the joint detection unit 15 and performs processing.

Further, in the first example embodiment, the storage unit 14 may be realized by storing a data files in a storage device such as a hard disk provided in the computer. And then, the storage unit 14 may be realized by a storage device of another computer. Example of computer includes smartphone and tablet-type terminal device in addition to general-purpose personal computer.

The program according to the first example embodiment may also be executed by a computer system built from a plurality of computers. In this case, for example, each computer may function as the feature map generation unit 11, the grouping unit 12, the image data acquisition unit 13, and the joint detection unit 15.

Second Example Embodiment

Figure 6:
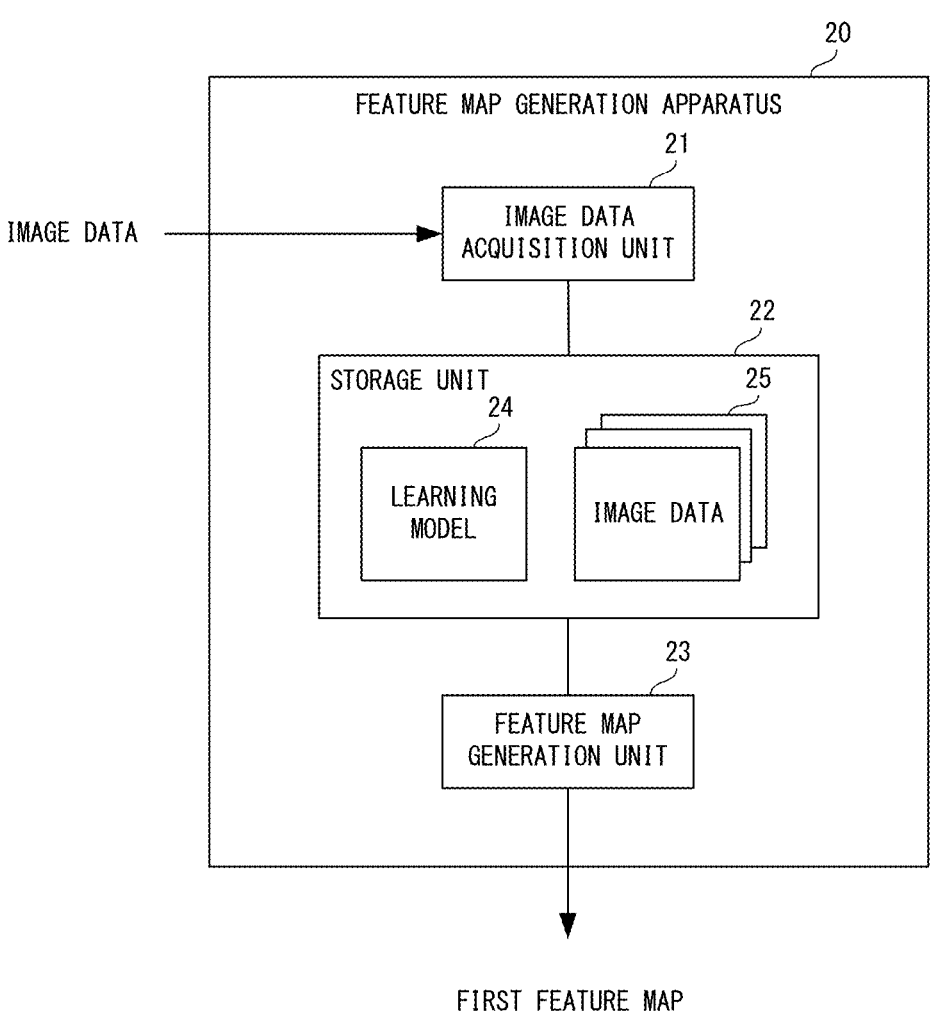
FIG. 6 is a block diagram showing an example of a configuration of a feature map generation apparatus according to a second example embodiment.

The following describes a feature map generation apparatus, a feature map generation method, and a program for feature map generating in a second example embodiment with reference to FIG. 6.

As shown in FIG. 6, in the second example embodiment, the feature map generation apparatus 20 is an apparatus for generating the first feature map and the second feature map shown in FIGS. 3A and 3B. As shown in FIG. 6, the feature map generation apparatus 20 includes an image data acquisition unit 21, a storage unit 22, and a feature map generation unit 23.

The image data acquisition unit 21, the storage unit 22, and the feature map generation unit 23 are configured in the same manner as the image data acquisition unit 13, the storage unit 14, and the feature map generation unit 11 shown in FIG. 2 in the first example embodiment. The image data acquisition unit 21, the storage unit 22, and the feature map generation unit 23 have the same function as the image data acquisition unit 13, the storage unit 14, and the feature map generation unit 11.

Specifically, the image data acquisition unit 21 acquires the image data 25 of the image including persons captured by the imaging device and stores the acquired image data 25 in the storage unit 22, similarly to the image data acquisition unit 13. The storage unit 22 stores the learning model 24 as well as the storage unit 14.

The feature map generation unit 23 generates the first feature map shown in FIG. 3A and the second feature map shown in FIG. 3B, similarly to the feature map generation unit 11. Also in the second example embodiment, the feature map generation unit 23 generates the first feature map and the second feature map by using the learning model 24 stored in the storage unit 22.

Similar to the learning model 16, the learning model 24 is constructed by machine learning the relationship between the image including a person and the first feature map and the second feature map in advance by deep learning or the like. The learning model 24 is stored in the storage unit 22. The learning model 24 is also constructed by the learning model generation apparatus described later.

In this way, according to the feature map generation apparatus 20, the first feature map and the second feature map can be generated. In the second example embodiment, the feature map generation apparatus 20 may be configured to include only the feature map generation unit 23.

Further, in the second example embodiment, the feature map generation method is realized by executing the same steps as steps A1 and A2 shown in FIG. 5 in the feature map generation apparatus 20. Further, by using a program that causes a computer to execute steps A1 and A2 shown in FIG. 5, the feature map generation apparatus 20 and the feature map generation method according to the second example embodiment can be realized.

Third Example Embodiment

Figure 7:
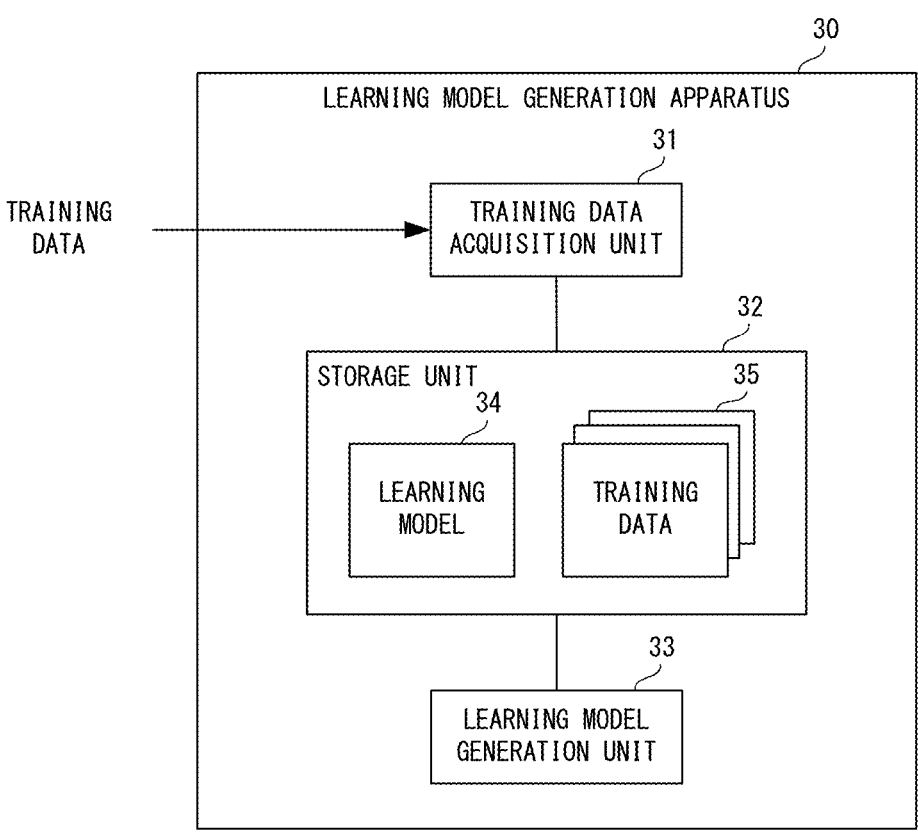
FIG. 7 is a block diagram showing an example of a configuration of a learning model generation apparatus according to a third example embodiment.
Figure 8:
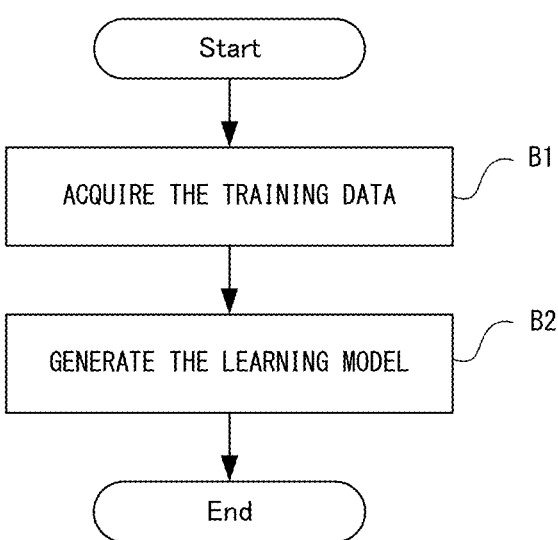
FIG. 8 is a flowchart showing operations of the learning model generation apparatus according to the third example embodiment.

The following describes a learning model generation apparatus, a learning model generation method, and a program for learning model generating in a third example embodiment with reference to FIGS. 7 and 8.

Apparatus Configuration

First, a configuration of the learning model generation apparatus according to the third example embodiment will be described with reference to FIG. 7. FIG. 7 is a block diagram showing an example of a configuration of a learning model generation apparatus according to a third example embodiment.

The learning model generation apparatus 30 shown in FIG. 7 in the third example embodiment is an apparatus for generating the learning model used in the first and second example embodiments. As shown in FIG. 7, the learning model generation apparatus 30 according to the third example embodiment includes a training data acquisition unit 31, a storage unit 32, and a learning model generation unit 33.

The training data acquisition unit 31 acquires a training data 35. The training data 35 is composed of an image data of an image including a person, a first feature map for specifying the location of the person in the image in the horizontal direction, and a second feature map for specifying the location of the person in the image in the vertical direction. The acquired training data 35 is stored in the storage unit 32.

The learning model generation unit 33 uses the training data 35 stored in the storage unit 32 to perform machine learning on a relationship between the image and the first feature map, and a relationship between the image and the second feature map. As a result, the learning model 34 is generated. Examples of machine learning methods include deep learning.

Specifically, the learning model generation unit 33 first inputs the image data of the image into the learning model, and outputs the first feature map and the second feature map from the learning model. Then, the learning model generation unit 33 obtains the difference between the output first feature map and the second feature map, and the first feature map and the second feature map used as the training data.

And, the learning model generation unit 33 update the parameters of the learning model so that the difference is small. In this way, the learning model 34 is generated by updating the parameters of the learning model with the training data.

Apparatus Operations

Next, operations of the learning model generation apparatus 30 according to the third example embodiment will be described with reference to FIG. 8. FIG. 8 is a flowchart showing operations of the learning model generation apparatus according to the third example embodiment. In the following description, FIG. 7 is referenced when necessary. Also, in the third example embodiment, the learning model generation method is carried out by operating the learning model generation apparatus 30. Therefore, the following description of operations of the learning model generation apparatus 30 substitutes for a description of the learning model generation method in the third example embodiment.

As shown in FIG. 8, first, the training data acquisition unit 31 acquires the image data of the image including a person, the first feature map corresponding to the image data, and the second feature map corresponding to the image data, as the training data (Step B1). Further, the training data acquisition unit 31 stores the acquired training data 35 in the storage unit 32.

Next, the learning model generation unit 33 uses the training data 35 stored in the storage unit 32 to learn the relationship between the image and the first feature map and the relationship between the image and the second feature map by machine learning (step B2). As a result, the learning model 34 is generated.

Thus, according to the third example embodiment, the learning model 34 is generated. The learning model 34 learns the relationship between the image data and the first feature map, and the relationship between the image data and the second feature map. The generated learning model 34 can be used in embodiments 1 and 2.

Program

A program for learning model generating according to the third example embodiment may be a program that enables a computer to execute the steps B1 to B2 shown in FIG. 8. It is possible to realize the learning model generating apparatus 30 and the learning model generating method according to the third example embodiment by installing this program to a computer and executing the program. In this case, a processor of the computer functions as the training data acquisition unit 31 and the learning model generation unit 33 and performs processing.

Further, in the third example embodiment, the storage unit 32 may be realized by storing a data files in a storage device such as a hard disk provided in the computer. And then, the storage unit 14 may be realized by a storage device of another computer. Example of computer includes smartphone and tablet-type terminal device in addition to general-purpose personal computer.

The program according to the third example embodiment may also be executed by a computer system built from a plurality of computers. In this case, for example, each computer may function as the training data acquisition unit 31 and the learning model generation unit 33.

Physical Configuration

Figure 9:
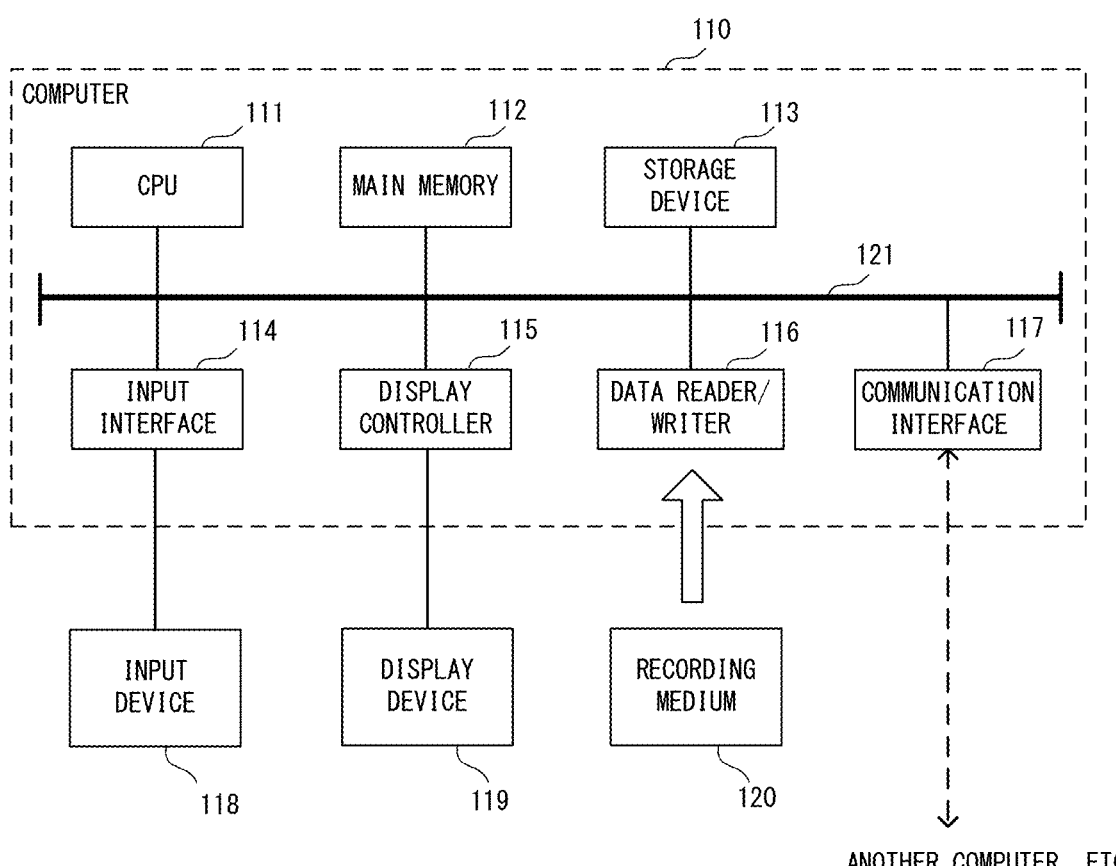
FIG. 9 is a block diagram showing an example of a computer that realizes the image processing apparatus, the feature map generation apparatus the learning model generation apparatus according to the first to third example embodiment.

Hereinafter, a computer that realizes the image processing apparatus 10, the feature map generation apparatus 20, and learning model generation apparatus 30 by executing the program will be described with reference to FIG. 9. FIG. 9 is a block diagram showing an example of a computer that realizes the image processing apparatus, the feature map generation apparatus the learning model generation apparatus according to the first to third example embodiment.

As shown in FIG. 9, a computer 101 includes a CPU 111, a main memory 112, a storage device 113, an input interface 114, a display controller 115, a data reader/writer 116, and a communication interface 117. These units are connected so as to be able to perform data communication with each other via a bus 121.

The computer 110 may include a GPU (Graphics Processing Unit) or an FPGA (Field-Programmable Gate Array) in addition to the CPU 111 or instead of the CPU 111. In this aspect, the GPU or FPGA can execute the program in the embodiment.

The CPU 11 loads the program composed of codes stored in the storage device 113 to the main memory 112 and execute each code in a predetermined order to perform various kinds of computations. The main memory 112 is typically a volatile storage device such as a DRAM (Dynamic Random-Access Memory).

The program according to the example embodiments is provided in the state of being stored in a computer-readable recording medium 120. Note that the program according to the first and second example embodiments may be distributed on the internet connected via a communication interface 117.

Specific examples of the storage device 113 include a hard disk drive, and a semiconductor storage device such as a flash memory. The input interface 114 mediates data transmission between the CPU 111 and input devices 118 such as a keyboard and a mouse. The display controller 115 is connected to a display device 119, and controls display on the display device 119.

The data reader/writer 116 mediates data transmission between the CPU 111 and a recording medium 120, reads the program from the recording medium 120, and writes the result of processing in the computer 110 to the recording medium 120. The communication interface 117 mediates data transmission between the CPU 111 and another computer.

Specific examples of the recording medium 120 include general-purpose semiconductor storage devices such as a CF (Compact Flash (registered trademark)) and an SD (Secure Digital), magnetic recording media such as a Flexible Disk, and optical recording media such as a CD-ROM (Compact Disk Read Only Memory).

Note that the image processing apparatus 10, the feature map generation apparatus 20, and learning model generation apparatus 30 can be realized using hardware corresponding to the respective units thereof instead of a computer to which a program is installed. Furthermore, part of the image processing apparatus 10, part of the feature map generation apparatus 20, and part of learning model generation apparatus 30 may be realized using a program, and the rest may be realized using hardware. The hardware here includes an electronic circuit.

One or more or all of the above-described example embodiments can be represented by the following (Supplementary note 1) to (Supplementary note 20). but the above-described example embodiments are not limited to the following description.

Supplementary Note 1

An image processing apparatus comprising:
a feature map generation unit configured to generate a first feature map that specifies a horizontal location of the person in an image in a horizontal direction and a second feature map that specifies a vertical location of the person in the image in a vertical direction,
a grouping unit configured to use locations of joints detected in the image in the horizontal direction and vertical direction, the first feature map, and the second feature map, to group each of the joints to a corresponding person.

Supplementary Note 2

The image processing apparatus according to Supplementary note 1,
wherein the feature map generation unit configured to generate, as the first map, a map that is composed of the same number of pixels as the pixels constituting the image, and assigns a numerical value indicating a location of the person in the horizontal direction to each of the pixels in an area corresponding to the person,
the feature map generation unit configured to generate, as the second map, a map that is composed of the same number of pixels as the pixels constituting the image, and assigns a numerical value indicating a location of the person in the vertical direction to each of the pixels in an area corresponding to the person.

Supplementary Note 3

The image processing apparatus according to Supplementary note 2,
wherein the numerical value indicating the location of the person in the horizontal direction is a value that indicates the ratio of a distance in the horizontal direction from an origin of the first feature map to a reference point of the person with respect to a horizontal length of the first feature map,
the numerical value indicating the location of the person in the vertical direction is a value that indicates the ratio of a distance in the vertical direction from an origin of the second feature map to the reference point of the person with respect to a vertical length of the second feature map.

Supplementary Note 4

The image processing apparatus according to any of Supplementary notes 1 to 3,
wherein the feature map generation unit generates the first feature map and the second feature map by using a learning model in which a relationship between an image, the first feature map, and the second feature map is machine-learned.

Supplementary Note 5

The image processing apparatus according to Supplementary note 2 or 3,
wherein the grouping unit specifies, for the joints detected from the image, for each person in the image, the numerical value of the pixel corresponding to the joint in the first feature map and the numerical value of the pixel corresponding to the joint in the second feature map, and
the grouping unit calculates, for the joints detected from the image, for each person in the image, a distance between the joint and the person, by using the two numerical values specified, the numerical value indicating the location of the person in the horizontal direction, and the numerical value indicating the location of the person in the vertical direction,
the grouping unit determines, for the joints detected from the image, a person corresponding to the joint based on the calculated distance, and groups based on the determination result.

Supplementary Note 6

The image processing apparatus according to Supplementary note 5,
wherein the grouping unit determines the person corresponding to the joint on the condition that the calculated distance does not exceed a threshold value and that a plurality of joints of the same type do not correspond to the same person.

Supplementary Note 7

A feature map generation apparatus comprising:
a feature map generation unit configured to generate a first feature map that specifies a horizontal location of the person in an image in a horizontal direction and a second feature map that specifies a vertical location of the person in the image in a vertical direction.

Supplementary Note 8 a learning model generation apparatus comprising:
a learning model generation unit configured to use an image including a person, a first feature map for specifying the location of the person in a horizontal direction in the image, and a second feature map for specifying the location of the person in a vertical direction in the image as training data, to generate a learning model in which a relationship between the image, the first feature map, and the second feature map is machine-learned.

Supplementary Note 9

An image processing method comprising:
a feature map generation step of generating a first feature map that specifies a horizontal location of the person in an image in a horizontal direction and a second feature map that specifies a vertical location of the person in the image in a vertical direction,
a grouping step of using locations of joints detected in the image in the horizontal direction and vertical direction, the first feature map, and the second feature map, to group each of the joints to a corresponding person.

Supplementary Note 10

The image processing method according to Supplementary note 9,
wherein, in the feature map generation step, generating, as the first map, a map that is composed of the same number of pixels as the pixels constituting the image, and assigns a numerical value indicating a location of the person in the horizontal direction to each of the pixels in an area corresponding to the person, in the feature map generation step, generating, as the second map, a map that is composed of the same number of pixels as the pixels constituting the image, and assigns a numerical value indicating a location of the person in the vertical direction to each of the pixels in an area corresponding to the person.

Supplementary Note 11

The image processing method according to Supplementary note 10, wherein the numerical value indicating the location of the person in the horizontal direction is a value that indicates the ratio of a distance in the horizontal direction from an origin of the first feature map to a reference point of the person with respect to a horizontal length of the first feature map, the numerical value indicating the location of the person in the vertical direction is a value that indicates the ratio of a distance in the vertical direction from an origin of the second feature map to the reference point of the person with respect to a vertical length of the second feature map.

Supplementary Note 12

The image processing method according to any of Supplementary notes 9 to 11, wherein, in the feature map generation step, generating the first feature map and the second feature map by using a learning model in which a relationship between an image, the first feature map, and the second feature map is machine-learned.

Supplementary Note 13

The image processing method according to Supplementary note 10 or 11, wherein, in the grouping step, specifying, for the joints detected from the image, for each person in the image, the numerical value of the pixel corresponding to the joint in the first feature map and the numerical value of the pixel corresponding to the joint in the second feature map, and calculating, for the joints detected from the image, for each person in the image, a distance between the joint and the person, by using the two numerical values specified, the numerical value indicating the location of the person in the horizontal direction, and the numerical value indicating the location of the person in the vertical direction, and determining, for the joints detected from the image, a person corresponding to the joint based on the calculated distance, and groups based on the determination result.

Supplementary Note 14

The image processing method according to Supplementary note 13, wherein, in the grouping step, determining the person corresponding to the joint on the condition that the calculated distance does not exceed a threshold value and that a plurality of joints of the same type do not correspond to the same person.

Supplementary Note 15

A computer-readable recording medium that includes a program, the program including instructions that cause a computer to carry out:

a feature map generation step of generating a first feature map that specifies a horizontal location of the person in an image in a horizontal direction and a second feature map that specifies a vertical location of the person in the image in a vertical direction, a grouping step of using locations of joints detected in the image in the horizontal direction and vertical direction, the first feature map, and the second feature map, to group each of the joints to a corresponding person.

Supplementary Note 16

The computer-readable recording medium according to Supplementary note 15, wherein, in the feature map generation step, generating, as the first map, a map that is composed of the same number of pixels as the pixels constituting the image, and assigns a numerical value indicating a location of the person in the horizontal direction to each of the pixels in an area corresponding to the person, in the feature map generation step, generating, as the second map, a map that is composed of the same number of pixels as the pixels constituting the image, and assigns a numerical value indicating a location of the person in the vertical direction to each of the pixels in an area corresponding to the person.

Supplementary Note 17

The computer-readable recording medium according to Supplementary note 16, wherein the numerical value indicating the location of the person in the horizontal direction is a value that indicates the ratio of a distance in the horizontal direction from an origin of the first feature map to a reference point of the person with respect to a horizontal length of the first feature map, the numerical value indicating the location of the person in the vertical direction is a value that indicates the ratio of a distance in the vertical direction from an origin of the second feature map to the reference point of the person with respect to a vertical length of the second feature map.

Supplementary Note 18

The computer-readable recording medium according to any of Supplementary notes 15 to 17, wherein, in the feature map generation step, generating the first feature map and the second feature map by using a learning model in which a relationship between an image, the first feature map, and the second feature map is machine-learned.

Supplementary Note 19

The computer-readable recording medium according to Supplementary note 16 or 17, wherein, in the grouping step, specifying, for the joints detected from the image, for each person in the image, the numerical value of the pixel corresponding to the joint in the first feature map and the numerical value of the pixel corresponding to the joint in the second feature map, and calculating, for the joints detected from the image, for each person in the image, a distance between the joint and the person, by using the two numerical values specified, the numerical value indicating the location of the person in the horizontal direction, and the numerical value indicating the location of the person in the vertical direction, and determining, for the joints detected from the image, a person corresponding to the joint based on the calculated distance, and groups based on the determination result.

Supplementary Note 20

The computer-readable recording medium according to Supplementary note 19, wherein, in the grouping step, determining the person corresponding to the joint on the condition that the calculated distance does not exceed a threshold value and that a plurality of joints of the same type do not correspond to the same person.

While the invention has been described with reference to the example embodiment, the invention is not limited to the example embodiments described above. Various modifications that can be understood by a person skilled in the art may be applied to the configuration and the details of the present invention within the scope of the present invention.

INDUSTRIAL APPLICABILITY

As described above, according to the present invention, it is possible to perform an association between joints and a person without being influenced by the number of people present in the image. The present invention is useful for a system that estimates the posture of a person from an image.

REFERENCE SIGNS LIST

10 Image processing apparatus
11 Feature map generation unit
12 Grouping unit
13 Image data acquisition unit
14 Storage unit
15 Joint detection unit.
16 Learning model
17 Image data
20 Feature map generation apparatus
21 Image data acquisition unit
22 Storage unit
23 Feature map generation unit
24 Learning model
25 Image data
30 Learning model generation apparatus
31 Training data acquisition unit
32 Storage unit
33 Learning model generation unit
34 Learning model 35 Training data
111 CPU
112 Main memory
113 Storage device
114 Input interface
115 Display controller
116 Data reader/writer
117 Communication interface
118 Input device
119 Display device
120 Recording medium
121 Bus

What is claimed is:

1. An image processing apparatus comprising:
at least one memory storing instructions; and
at least one processor configured to execute the instructions to:
generate a first feature map that specifies horizontal locations of people in an image in a horizontal direction and a second feature map that specifies vertical locations of the people in the image in a vertical direction, and
use locations of joints detected in the image in the horizontal direction and the vertical direction, the first feature map, and the second feature map, to group each of the joints to corresponding people, among the people,
wherein the at least one processor is further configured to execute the instructions to:
generate, as the first feature map, a map that is composed of the same number of pixels as the pixels constituting the image, and assign numerical values of the people in the horizontal direction to each of the pixels in areas corresponding to the people,
generate, as the second feature map, a map that is composed of the same number of pixels as the pixels constituting the image, and assign numerical values of the people in the vertical direction to each of the pixels in areas corresponding to the people,
specify, for the joints detected from the image, for each of the people in the image, the numerical value of the pixel corresponding to the joint in the first feature map and the numerical value of the pixel corresponding to the joint in the second feature map,
calculate, for the joints detected from the image, for each of the people in the image, a distance between the joint and a corresponding person, by using the two numerical values specified, the numerical value indicating the location of the corresponding person in the horizontal direction, and the numerical value indicating the location of the corresponding person in the vertical direction, and
determine, for the joints detected from the image, the corresponding person corresponding to the joint based on the calculated distance, and groups based on the determination result.

2. The image processing apparatus according to claim 1,
wherein a numerical value indicating a location of a person in the horizontal direction is a value that indicates the ratio of a distance in the horizontal direction from an origin of the first feature map to a reference point of the person with respect to a horizontal length of the first feature map, and
wherein a numerical value indicating a location of the person in the vertical direction is a value that indicates the ratio of a distance in the vertical direction from an origin of the second feature map to the reference point of the person with respect to a vertical length of the second feature map.

3. The image processing apparatus according to claim 1, wherein the at least one processor is further configured to execute the instructions to:

generate the first feature map and the second feature map by using a learning model in which a relationship between an image, the first feature map, and the second feature map is machine-learned.

4. The image processing apparatus according to claim 1, wherein the at least one processor is further configured to execute the instructions to:

determine the corresponding person corresponding to the joint based on the calculated distance not exceeding a threshold value and that a plurality of joints of the same type do not correspond to the same person.

5. An image processing method comprising:

generating a first feature map that specifies horizontal locations of people in an image in a horizontal direction and a second feature map that specifies vertical locations of the people in the image in a vertical direction, using locations of joints detected in the image in the horizontal direction and the vertical direction, the first feature map, and the second feature map, to group each of the joints to corresponding people, among the people, wherein the generating the first feature map comprises generating, as the first feature map, a map that is composed of the same number of pixels as the pixels constituting the image, and assigns numerical values of the people in the horizontal direction to each of the pixels in areas corresponding to the people, wherein the generating the second feature map comprises generating, as the second feature map, a map that is composed of the same number of pixels as the pixels constituting the image, and assigns numerical values of the people in the vertical direction to each of the pixels in areas corresponding to the people, and wherein the method further comprises:

specifying, for the joints detected from the image, for each of the people in the image, the numerical value of the pixel corresponding to the joint in the first feature map and the numerical value of the pixel corresponding to the joint in the second feature map;

calculating, for the joints detected from the image, for each of the people in the image, a distance between the joint and a corresponding person, by using the two numerical values specified, the numerical value indicating the location of the corresponding person in the horizontal direction, and the numerical value indicating the location of the corresponding person in the vertical direction; and determining, for the joints detected from the image, the corresponding person corresponding to the joint based on the calculated distance, and groups based on the determination result.

6. The image processing method according to claim 5, wherein a numerical value indicating a location of a person in the horizontal direction is a value that indicates the ratio of a distance in the horizontal direction from an origin of the first feature map to a reference point of the person with respect to a horizontal length of the first feature map, and wherein a numerical value indicating a location of the person in the vertical direction is a value that indicates the ratio of a distance in the vertical direction from an origin of the second feature map to the reference point of the person with respect to a vertical length of the second feature map.

7. The image processing method according to claim 5, wherein, in the feature map generation, generating the first feature map and the second feature map by using a learning model in which a relationship between an image, the first feature map, and the second feature map is machine-learned.

8. The image processing method according to claim 5, wherein, in the grouping, determining the corresponding person corresponding to the joint based on the calculated distance not exceeding a threshold value and that a plurality of joints of the same type do not correspond to the same person.

9. A non-transitory computer-readable recording medium that includes a program, the program including instructions that cause a computer to carry out:

generating a first feature map that specifies horizontal locations of people in an image in a horizontal direction and a second feature map that specifies vertical locations of the people in the image in a vertical direction, using locations of joints detected in the image in the horizontal direction and the vertical direction, the first feature map, and the second feature map, to group each of the joints to corresponding people, among the people, wherein the generating the first feature map comprises generating, as the first feature map, a map that is composed of the same number of pixels as the pixels constituting the image, and assigns numerical values of the people in the horizontal direction to each of the pixels in areas corresponding to the people, wherein the generating the second feature map comprises generating, as the second feature map, a map that is composed of the same number of pixels as the pixels constituting the image, and assigns numerical values of the people in the vertical direction to each of the pixels in areas corresponding to the people, and wherein the program further includes instructions that cause the computer to carry out:

specifying, for the joints detected from the image, for each of the people in the image, the numerical value of the pixel corresponding to the joint in the first feature map and the numerical value of the pixel corresponding to the joint in the second feature map;

calculating, for the joints detected from the image, for each of the people in the image, a distance between the joint and a corresponding person, by using the two numerical values specified, the numerical value indicating the location of the corresponding person in the horizontal direction, and the numerical value indicating the location of the corresponding person in the vertical direction; and determining, for the joints detected from the image, the corresponding person corresponding to the joint based on the calculated distance, and groups based on the determination result.

10. The non-transitory computer-readable recording medium according to claim 9, wherein a numerical value indicating a location of a person in the horizontal direction is a value that indicates the ratio of a distance in the horizontal direction from an origin of the first feature map to a reference point of the person with respect to a horizontal length of the first feature map, and wherein a numerical value indicating a location of the person in the vertical direction is a value that indicates the ratio of a distance in the vertical direction from an origin of the second feature map to the reference point of the person with respect to a vertical length of the second feature map.

11. The non-transitory computer-readable recording medium according to claim 9,
wherein, in the feature map generation, generating the first feature map and the second feature map by using a learning model in which a relationship between an image, the first feature map, and the second feature map is machine-learned.

12. The non-transitory computer-readable recording medium according to claim 9,
wherein, in the grouping, determining the corresponding person corresponding to the joint based on the calculated distance not exceeding a threshold value and that a plurality of joints of the same type do not correspond to the same person.

* * * * *